United States Patent
Dumbleton et al.

(10) Patent No.: US 9,264,883 B2
(45) Date of Patent: Feb. 16, 2016

(54) METHOD, APPARATUS AND COMPUTER READABLE MEDIUM FOR TERMINATING AND NEWLY CONSTRUCTING A SEND ROUTING INFORMATION (SRI) MESSAGE IN MOBILE NETWORKS

(71) Applicant: MARKPORT LIMITED, Dublin (IE)

(72) Inventors: Simon Dumbleton, Lower Earley (GB);
Jim Plimmer, Sherfield English (GB);
Ian Birchall, Nantwich (GB)

(73) Assignee: MARKPORT LIMITED (IE)

( * ) Notice: Subject to any disclaimer, the term of this patent is extended or adjusted under 35 U.S.C. 154(b) by 0 days.

(21) Appl. No.: 14/456,453

(22) PCT Filed: Feb. 20, 2013

(86) PCT No.: PCT/EP2013/053338
§ 371 (c)(1),
(2) Date: Aug. 11, 2014

(87) PCT Pub. No.: WO2013/127667
PCT Pub. Date: Sep. 6, 2013

(65) Prior Publication Data
US 2015/0141003 A1    May 21, 2015

Related U.S. Application Data

(60) Provisional application No. 61/605,793, filed on Mar. 2, 2012.

(51) Int. Cl.
*H04W 4/14* (2009.01)
*H04W 8/12* (2009.01)
(Continued)

(52) U.S. Cl.
CPC  *H04W 8/12* (2013.01); *H04W 4/20* (2013.01); *H04W 8/04* (2013.01); *H04W 8/26* (2013.01); *H04W 80/085* (2013.01); *H04W 4/14* (2013.01)

(58) Field of Classification Search
CPC ...... H04W 4/12; H04W 4/14; H04L 12/5895; H04L 51/38

USPC .......................................................... 455/466
See application file for complete search history.

(56) References Cited

U.S. PATENT DOCUMENTS 7,751,837 B2      7/2010  Aaltonen et al.
2004/0156495 A1*  8/2004  Chava et al. .................. 379/392
(Continued)

FOREIGN PATENT DOCUMENTS

EP    1626590 A1    2/2006
EP    1408705 B1    9/2006
(Continued)

OTHER PUBLICATIONS

International Search Report; PCT/EP2013/053338; Aug. 1, 2013.
(Continued)

*Primary Examiner* — Kevin Kim
(74) *Attorney, Agent, or Firm* — Ohlandt, Greeley, Ruggiero & Perle, L.L.P.

(57) ABSTRACT

An originating SMSC in Network A issues an SRI-SM towards the HLR of a recipient (User B in Network B). One of a number of N Platforms or Message Controllers ("MCOs") intercepts the SRI-SM. Instead of passing on the SRI-SM, the MCO terminates it and performs a full decode of all fields, specifically extracting the recipient MSISDN from it. The MCO then constructs a new SRI-SM for the same MSISDN, but forcing the new request to ask for all available data, including, but not necessarily limited to visited-MSC address, SGSN address and IP-SM-GW address. When a response is received the MCO generates a fresh query response for the originating SMSC instead of merely routing on the response which it receives. If the MCO is programmed to provide a false address for smart services it incorporates the false address in the query response which it generates.

30 Claims, 4 Drawing Sheets

(51) Int. Cl.
*H04W 4/20* (2009.01)
*H04W 80/08* (2009.01)
*H04W 8/04* (2009.01)
*H04W 8/26* (2009.01)

(56) References Cited

U.S. PATENT DOCUMENTS

2005/0186969 A1* 8/2005 Lohtia ................. 455/456.3
2011/0287764 A1* 11/2011 Zitnik ................... 455/433
2012/0149326 A1 6/2012 Zhang et al.

FOREIGN PATENT DOCUMENTS

| EP | 1683375 | B1 | 12/2007 |
| EP | 1998525 | A1 | 12/2008 |
| EP | 2273809 | A1 | 1/2011 |
| GB | 2473763 | B | 8/2011 |
| WO | 2011/022967 | A1 | 3/2011 |

OTHER PUBLICATIONS

"3rd Generation Partnership Project; Technical Specification Group Core Network and Terminals; Technical realization of the Short Message Service (SMS)(Release 11)"; 3GPP Standard; 3GPP TS 23.040, 3rd Generation Partnership Project (3GPP), Mobile Competence Centre; 650, Route Des Lucioles; F-06921 Sophia-Antipoles CEDEX; France; vol. CT WG1, No. V11.0.0, Dec. 20, 2011, pp. 1-202, XP050554674.
International Preliminary Report on Patentability of the International Searching Authority; PCT/EP2013/053338; issued on Sep. 2, 2014.
Written Opinion of the International Searching Authority; PCT/EP2013/053338; issued on Sep. 2, 2014.

* cited by examiner

The MCO can query multiple sources of data and make decisions regarding what to do, based on that information.

METHOD, APPARATUS AND COMPUTER READABLE MEDIUM FOR TERMINATING AND NEWLY CONSTRUCTING A SEND ROUTING INFORMATION (SRI) MESSAGE IN MOBILE NETWORKS

FIELD OF THE INVENTION

The invention relates to routing of messages in mobile networks.

PRIOR ART DISCUSSION

It is known to provide false routing information in response to a routing information request in a mobile network, so that the subsequently-forwarded message is directed to a node which directs additional services to be performed.

EP1683375 (Anam Mobile) describes an approach in which routing information requests are intercepted by a node which provides a response with its own address. When it receives the subsequent message it directs value added services to be performed. EP1408705 (Telsis) also describes such an approach. In this case the false addressing is performed by a router and the false address is that of the router itself or a different router.

EP1626590 (Telsis Holdings Ltd) describes a router sending an incoming SRI-SM to one of a number of possible HLRs.

U.S. Pat. No. 7,751,837 (CVON Innovations Ltd.) describes a method in which a moderator server receives an SRI-SM, and the moderator server generates the routing instructions, to cause the message to be routed to a gateway. One application is archiving of messages.

GB2473763 (Oracle) describes a mobile delivery platform intercepting a routing request and determining if the recipient subscriber has subscribed to value added services. If so, the mobile delivery platform generates a response with routing information to route the subsequent message to a message handling component. This reduces traffic to the HLR.

FIG. 1 shows a typical scenario for delivery of a message from a device in a network A to a device in a network B. A MOFSM in network A causes an SMSC of this network to forward an SRT-SM to the HLR of the B network. The response provides the address of the serving MSC, to which the MT-FSM is forwarded for delivery to the device B.

A problem with this scenario is that network elements change and evolve at different rates. Hence the incoming SRI-SM may not be suitable for gleaning all possible information from the foreign network's (in this case, B) HLR, which could be a HSS or equivalent.

The invention addresses this problem. Another object is to achieve additional flexibility in the manner of providing additional to the subscriber.

Glossary of Terms and their Definitions:

| Term | Definition |
|---|---|
| 3GPP | 3$^{rd}$ Generation Partnership Project<br>The organisation that publishes and maintains the GSM-based standards from 2G through 3G to 4G. |
| HPLMN | Home Public Land Mobile Network<br>The home network of a subscriber |
| IMSI | International Mobile Subscriber Identification<br>A number which uniquely identifies a subscriber, including which country and network they're a subscriber of. |
| IP-SM-GW | IP Short Message Gateway<br>A network element that bridges a 2/3G network and an Evolved Packet Core to enable SMS delivery to LTE devices. (Not limited to LTE as EPC can support alternative technologies such as WiFi or WiMax) |
| MSC | Mobile Switching Centre<br>The system to which a mobile is attached and SMS delivery over SS7 either originates or terminates. |
| MSISDN | Mobile Station Phone Number |
| RBDL | Rules Based Decision Logic<br>A rules configuration language used to provide flexibility in the handling of the message flow. |
| SGSN | Serving GPRS Support Node<br>This node acts as a gateway between the GPRS/3G IP devices and the SS7 world of SMS. |
| Sh-Pull | Sh is a Diameter-based interface<br>Pull implies a client is requesting information from the server. |
| SM-RP-PRI | Short Message Priority |
| SRI-SM | SendRoutingInformationforShortMessage<br>GSM/3GPP MAP operation issued by an SMSC in order to determine where (which network element) to send the message for onward delivery to the recipient. |

SUMMARY OF THE INVENTION

According to the invention, there is provided a message controller for a mobile network, the message controller comprising a digital processor and signal ports and being adapted to:

receive an incoming original routing query from a message service centre, process the routing query and use information in the query to generate at least one fresh routing query, and send each fresh routing query to the destination of the original routing query and/or to an alternative destination.

In one embodiment, the message controller is adapted to extract the MSTSDN or equivalent in the original routing query and to determine what further information could be obtained in addition to what was requested in the original routing query.

In one embodiment, the additional information is an SGSN address or IP-SM-GW address.

In a further embodiment, the message controller is adapted to cache data and use said cached data to generate the fresh routing query.

In one embodiment, the message controller is adapted to maintain a register of currently available resource servers, to retrieve information from said resource servers for use in generating the fresh routing query or to determine where the fresh routing query is to be sent.

In another embodiment, a resource server is a presence server, and the message controller is adapted to convert an MSISDN to a URI/IM address and to send a fresh routing query to the presence server. In one embodiment, the message controller is adapted to send a fresh routing query to a HSS. Preferably, the fresh routing query is in the Diameter protocol.

In one embodiment, the message controller is adapted to receive a response to the fresh routing query and to generate a fresh response for the message service centre which sent the original routing query. In one embodiment, the fresh response includes data retrieved from a database or from a remote resource server. Preferably, the fresh response includes a false address to cause the message to be sent to a smart services control node.

In one embodiment, said node is the message controller or a different network element such as a different message controller. In one embodiment, the node is one of a plurality of message controllers which is dynamically selected. In one embodiment, the fresh response includes a shared global title for versatile processing and onward routing of the message.

In one embodiment, the message controller is adapted to send a plurality of fresh routing queries, such as a HSS query followed by a HLR query.

In one embodiment, the processor is adapted to execute application functions on a sequenced operation layer. Preferably, the processor is adapted to add or delete application functions, or change their sequence, in a modular manner.

In one embodiment, the processor is adapted to execute Rule Based Decision Logic programs.

In another aspect, the invention provides a method of operation of a message controller for a mobile network, the message controller comprising a digital processor and signal ports, and the method comprising the steps of:

receiving an incoming original routing query from a message service centre, processing the routing query and using information in the query to generate at least one fresh routing query, and sending each fresh routing query to the destination of the original routing query and/or to an alternative destination. In one embodiment, the message controller extracts the MSTSDN or equivalent in the original routing query and determines what further information could be obtained in addition to what was requested in the original routing query. In one embodiment, the additional information is an SGSN address or TP-SM-GW address. Preferably, the message controller caches data and uses said cached data to generate the fresh routing query.

In one embodiment, the message controller maintains a register of currently available resource servers from which information is retrieved either for generating the fresh routing query or to determine which the fresh routing query is to be sent to.

In one embodiment, a resource server is a presence server, and the message controller converts an MSISDN to a URI/IM address and sends a fresh routing query to the presence server.

In one embodiment, the message controller sends a fresh routing query to a HSS. In one embodiment, the fresh routing query is in the Diameter protocol. In one embodiment, the message controller receives a response to the fresh routing query and generates a fresh response for the message service centre which sent the original routing query. In one embodiment, the fresh response includes data retrieved from a database or from a remote resource server.

Preferably, the fresh response includes a false address to cause the message to be sent to a smart services control node. In one embodiment, said node is the message controller or a different network element such as a different message controller. In one embodiment, the node is one of a plurality of message controllers which is dynamically selected.

In one embodiment, the fresh response includes a shared global title for versatile processing and onward routing of the message. In one embodiment, the message controller sends a plurality of fresh routing queries, such as a HSS query followed by a HLR query. In one embodiment, the message controller exchanges SIP OPTIONS to determine presence and device capabilities.

In another aspect, the invention provides a computer readable medium comprising software code adapted to perform the steps of a method as defined above in any embodiment when executing on a digital processor.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

The invention extends reachability of SMS when subscribers move to other messaging forms or the HPLMN of the recipient is more technically advanced than the HPLMN of the originator, for example, the recipient is available over IP-SM-GW, but the originator cannot support that.

Figure 1:
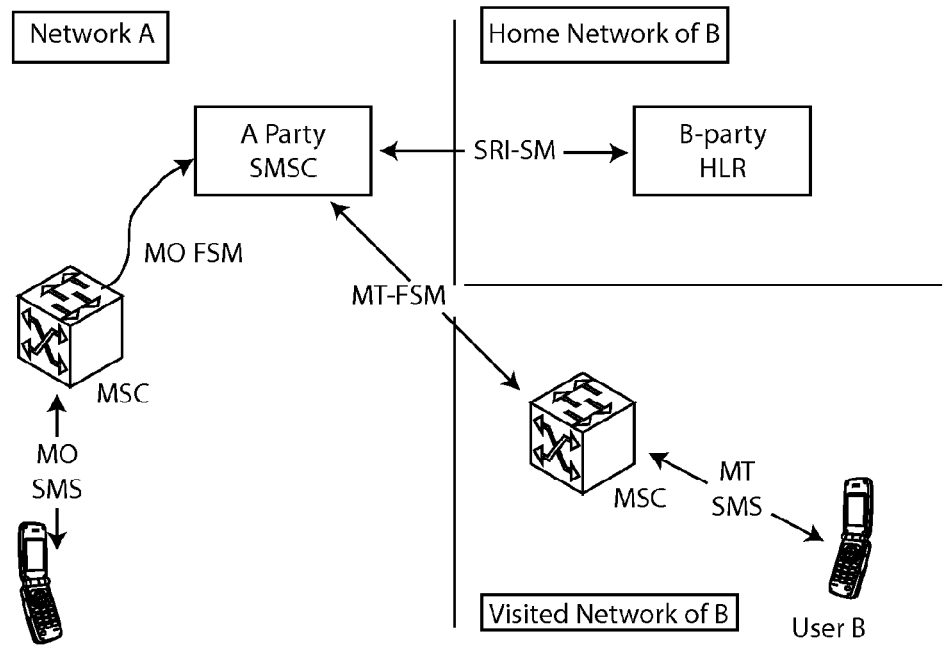
FIG. 1 is a flow diagram for a routing scenario of the prior art, as described above.
Figure 2:
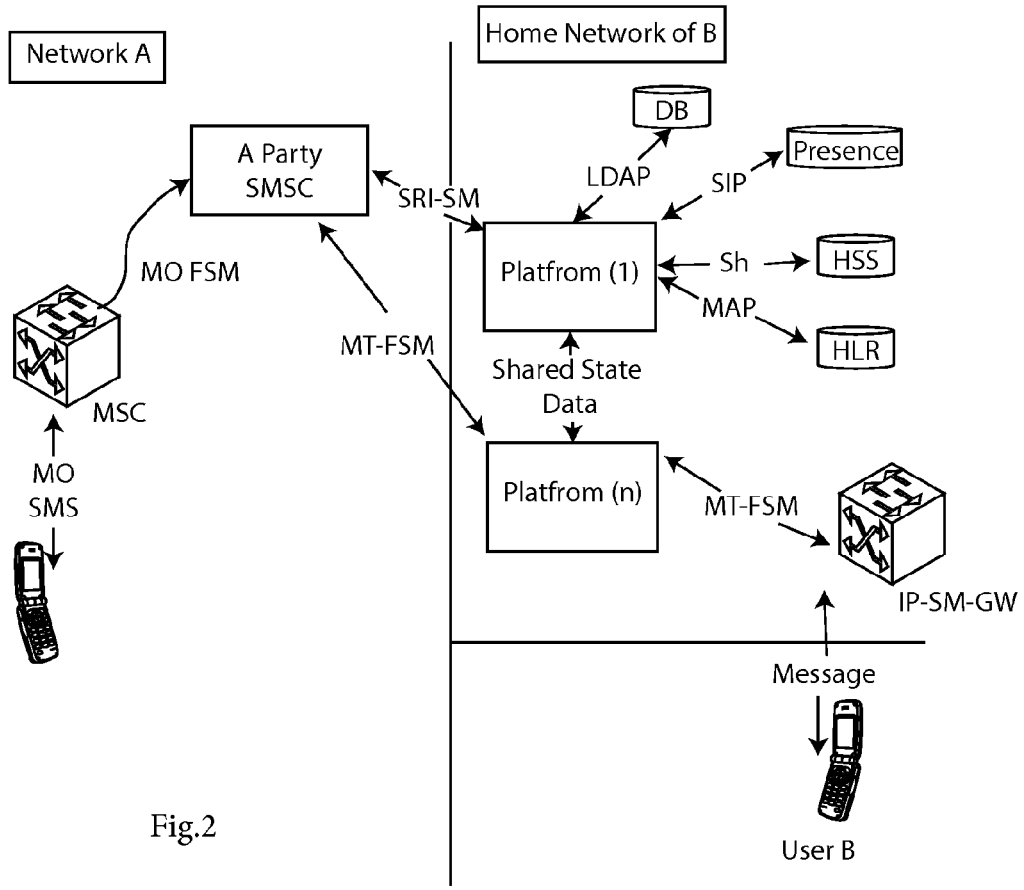
FIG. 2 is a block diagram of context of a platform of the invention.

Referring to FIG. 2, when an originating SMSC in Network A issues an SRI-SM towards the HLR of a recipient (User B in Network B), one of a number of N Platforms or Message Controllers ("MCOs") intercepts the SRI-SM. Instead of passing on the SRI-SM, the MCO terminates it and performs a full decode of all fields, specifically extracting the recipient MSISDN from it. The MCO then constructs a new SRI-SM for the same MSISDN, but forcing the new request to ask for all available data, including, but not necessarily limited to visited-MSC address, SGSN address and IP-SM-GW address.

When a response is received the MCO generates a fresh query response for the originating SMSC instead of merely routing on the response which it receives. If the MCO is programmed to provide a false address for smart services it incorporates the false address in the query response which it generates. This avoids need to modify the incoming response and allows considerable additional versatility. For example the MCO may provide a number of false addresses, depending on how it generates the query response.

The false address which it provides may be its own address, or that of another MCO, in FIG. 2 the nth MCO.

The MCO architecture is such that the Sequenced Operation Layer (SOL) co-ordinates the activities of multiple functional building blocks. These independent building blocks are named application functions (AFs) and each AF provides an element of functionality isolated from other functions within the MCO. By adding new AFs and/or re-ordering the sequence of AFs, the MCO can deliver new capabilities much faster than with legacy architecture.

An incoming SS7 PDU is decoded and handed off to the SOL for processing, where is passes through a coordinated sequence of AFs. These AFs can manipulate any or all of the parameters involved in the operation including sending it on to a final destination (which may be an alternative destination to the one originally intended). In addition, if necessary, the AFs could generate a response back to the originator of the incoming SS7 PDU. This response could be either a negative response (including reason code) or a positive response including cached or generated success criteria.

A message processed by the MCO consists of a number of attributes. However, the MCO allows customization and addition of customer-specific attributes, for example any subscriber attribute stored in an LDAP database can be added into a message and used as any other attribute in the MCO logic, such as for billing or routing.

The MCO logic is driven by Rule Based Decision Logic (RBDL). RBDL is a simple scripting language allowing system customization per message. Almost all predefined message attributes and all customer-specific attributes are available in rules; based on their values the operator applies decisions which affect processing of a message. All configuration granularity levels mentioned above are configurable using RBDL.

Figures 3, 4:
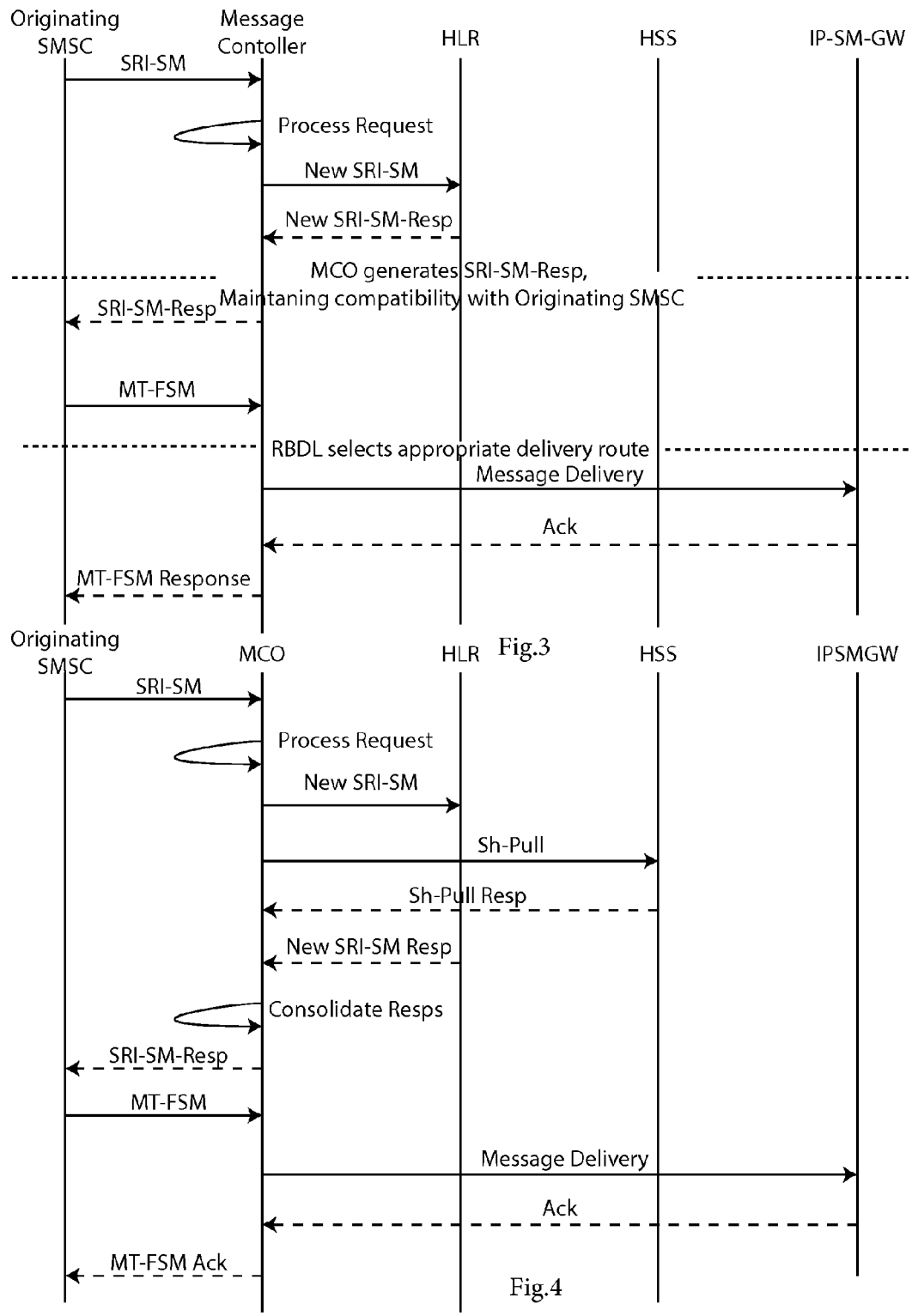
FIGS. 3 to 6 are ladder sequence diagrams for routing scenarios of the invention.

Referring to FIG. 3, when the MCO receives an SRI-SM it terminates it, disassembles it, and performs processing in order to generate a new SRI-SM. This is in contrast to the prior approach of EP1683375 (in which the inbound HLR query is merely routed on to the HLR). In the invention by terminating the inbound query in the MCO and generating a fresh query "New SRI-SM" the MCO can dynamically decide where to send the new query and how this new query should be configured for optimum information gathering. In the example of FIG. 3 the new query is sent to a HLR. When the response is received the MCO generates a fresh SRT-SM-Resp for the originating SMSC.

The SM-RP-PRT can be interpreted by the MCO to determine whether locally-cached information in the MCO can be used or, if priority is requested, then external queries can be performed.

Another option is to always set the SM-RP-PRI flag in any outbound SRI-SM from the MCO to ensure that its cache is up-to-date.

In addition to this, the MCO can query alternative sources for availability, such as a presence server (by converting the MSISDN to an appropriate URI/IM address), or by querying an HSS over Diameter (Sh)). Such queries can be used to formulate the new query.

If the recipient is available (based on responses to locally-generated queries) the MCO can then respond to the original SRI-SM request giving the IMSI (if available, otherwise a false IMSI) plus the address of the MCO as the visited MSC address. If the recipient is flagged as not available, the operator may choose to buffer all messages locally to enable optimized conversion to alternative technologies. An alternative to this is to use a local "presentation Global Title" as the address for the visited MSC address, such that the subsequent MT-FSM can be received by a plurality of nodes. The nodes share a distributed cache of information regarding the availability of the recipient, thus providing continuous service in the event of a node failure. This allows much more flexibility than the prior approach of the node which provides the false address giving its own address as the false address.

This enables that the MCO delivers the subsequent message across alternative delivery means regardless of the capabilities of the sending SMSC, thus improving recipient user experience.

Included in this termination and generation of an HLR query is the option to deploy the MCO in an EPC network and to use the Diameter interface to query the HSS or Presence Server instead of, or in addition to, the generation of an SRI-SM.

In this manner the MCO determines the optimal (from a subscriber experience perspective) technology and address for the onward delivery of the message(s).

At some point it may be preferable for an operator to configure the MCO to query a HSS using Sh prior to sending a new SRI-SM to the HLR as the majority of their subscribers will be present over TP and thus TP-SM-GW delivery will be more attractive and higher priority. if the subscriber is deemed to be available as a result of the HSS query, a query to the HLR may not be required at all.

The mechanisms and protocols used for querying the HSS (for example Diameter) are also much less resource intensive than the SS7-based interactions needed for HLR interrogation, therefore providing further optimisation to the message delivery process.

In addition to the above-mentioned procedural capabilities, the node can distribute its cache information across a cluster, therefore providing higher availability than a standalone platform. Therefore a subsequent MT-FSM can be received at any node in the cluster rather than having to be directed to the specific node which responded to the SRI-SM.

As described above with reference to FIG. 3 the new SRI-SM is sent to the HLR. The MCO decides according to RBDL to send the MT on to the IP-SM-GW in this example. Referring to FIG. 4, the MCO directs a new SRI-SM to a HLR, and a Sh-Pull message to a HSS. This diagram illustrates consolidation of the responses to provide an SRI-SM-Resp to the originating SMC. There is then message delivery via an IP-SM-GW.

Figure 5:
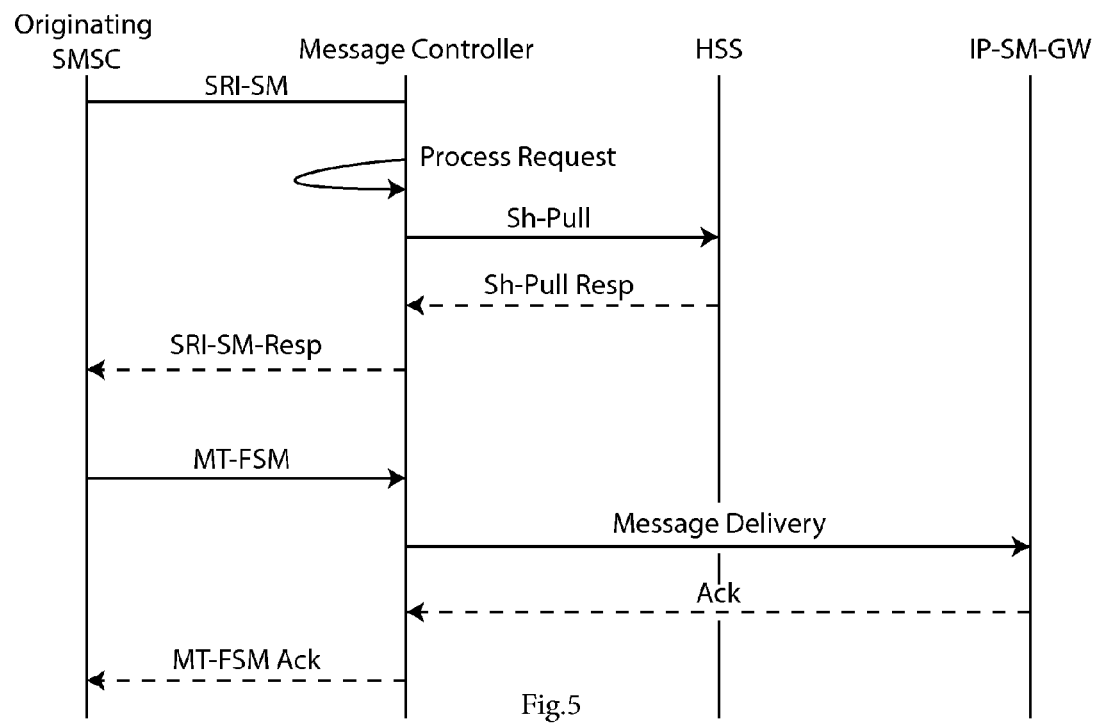

Referring to FIG. 5, in another embodiment an MCO processes the incoming SRI-SM, and then sends an Sh-Pull message to a HSS. The Sh-Pull Resp is used by the MCO to generate an SRI-SM-Resp for the originating SMSC. Again the MT-FSM is sent to an IP-SM-GW.

Figure 6:
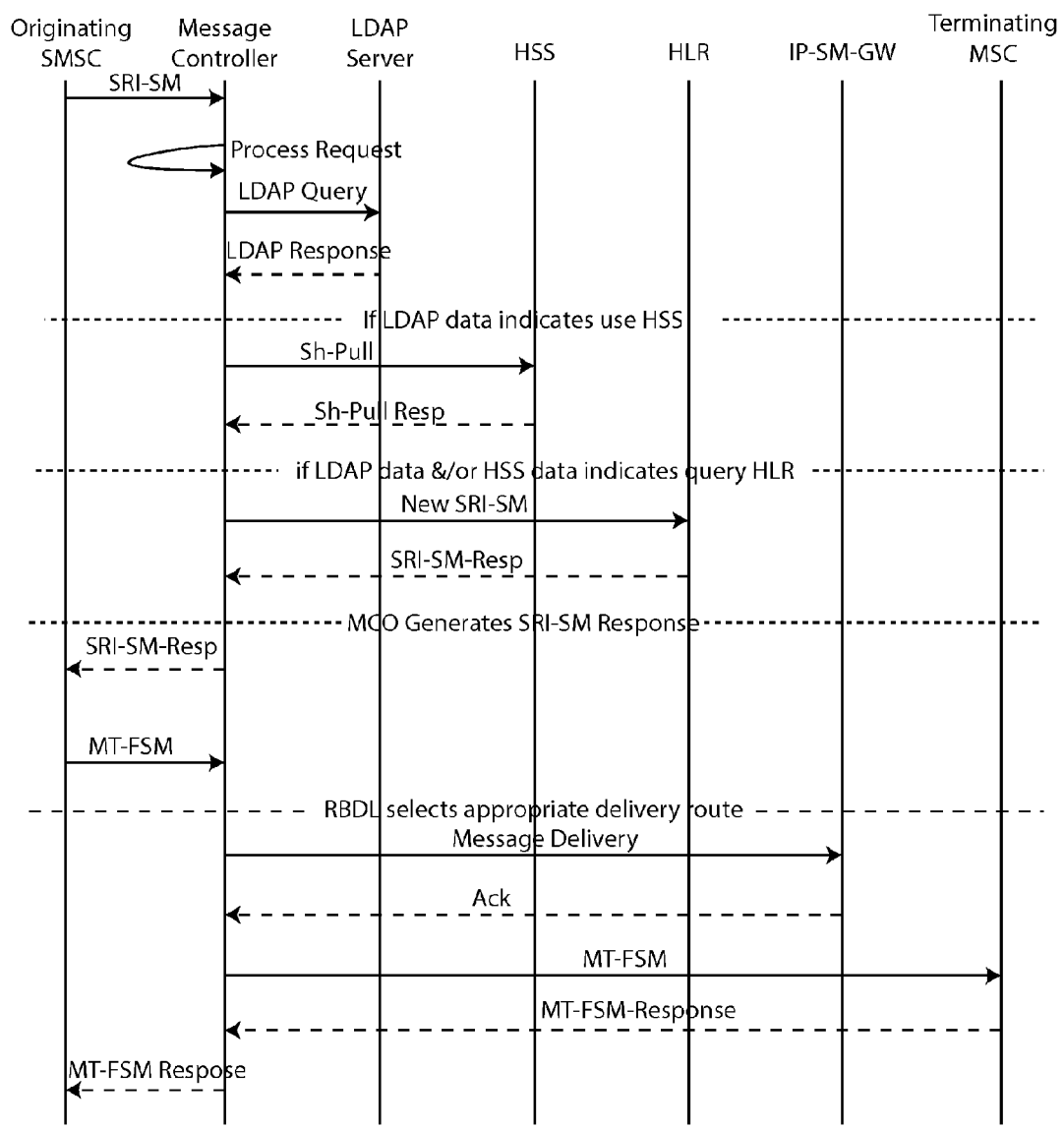

Referring to FIG. 6, the MCO generates an LDAP query, receives the LDAP server response and interprets it to determine if the HSS should be used. If so, an Sh-Pull is sent to the HSS, and its response is received and interpreted. If either response has indicated that the MCO should query the HLR, a new SRI-SM is generated and sent to the HLR. Using all responses, the MCO now generates a full SRI-SM-resp for the originating SMSC. The address given in this is the MCO's address, and so the MT-FSM is subsequently received, and is processed by the MCO to determine a delivery route, in this case to an IP-SM-GW and the terminating MSC.

It will be appreciated that the invention provides for optimal handling of routing queries, both in terms of making routing information available and in terms of where the subsequent message is routed. It allows excellent versatility as it enables the full functionality of a more advanced network to be availed of even if a message service centre of an originating network is of older technology.

The invention is not limited to the embodiments described but may be varied in construction and detail. For example, in RCS-e, SIP OPTIONS messages are exchanged to determine presence and device capabilities. In order to interwork between SMS and RCS-e, SIP OPTIONS requests can be generated by a message controller to determine if the recipient of a message is available for message delivery over RCS-e. An alternative to SIP OPTIONS is to leverage third party registration details from IMS registration of an RCS subscriber; in this case the Message Controller would query a third party registration database for availability/presence information.

The invention claimed is:

1. A message controller for a mobile network, the message controller comprising a digital processor and signal ports and being adapted to:
receive an incoming original routing query from a message service centre,
process the routing query and use information in the query to generate a plurality of fresh routing queries, and send each fresh routing query to the destination of the original routing query and/or to an alternative destination, wherein the message controller is adapted to:

maintain a register of currently available resource servers, retrieve information from said resource servers for use in generating the fresh routing query or to determine where the fresh routing query is to be sent, receive a response to the fresh routing query, generate a fresh response for the message service centre which sent the original routing query, and to execute application functions on a sequenced operation layer.

2. The message controller as claimed in claim 1, wherein the message controller is adapted to extract the MSISDN or equivalent in the original routing query and to determine what further information could be obtained in addition to what was requested in the original routing query.

3. The message controller as claimed in claim 1, wherein the message controller is adapted to extract the MSISDN or equivalent in the original routing query and to determine what further information could be obtained in addition to what was requested in the original routing query; and wherein the additional information is an SGSN address or IP-SM-GW address.

4. The message controller as claimed in claim 1, wherein the message controller is adapted to cache data and use said cached data to generate the fresh routing query.

5. The message controller as claimed in claim 1, wherein a resource server is a presence server, and the message controller is adapted to convert an MSISDN to a URI/IM address and to send a fresh routing query to the presence server.

6. The message controller as claimed in claim 1, wherein the message controller is adapted to send a fresh routing query to a HSS.

7. The message controller as claimed in claim 1, wherein the message controller is adapted to send a fresh routing query to a HSS, and wherein the fresh routing query is in the Diameter protocol.

8. The message controller as claimed in claim 1, wherein the fresh response includes data retrieved from a database or from a remote resource server.

9. The message controller as claimed in claim 1, wherein the fresh response includes a false address to cause the message to be sent to a smart services control node.

10. The message controller as claimed in claim 1, wherein the fresh response includes a false address to cause the message to be sent to a smart services control node, and wherein said node is the message controller or a different network element such as a different message controller.

11. The message controller as claimed in claim 1, wherein the fresh response includes a false address to cause the message to be sent to a smart services control node, wherein the node is one of a plurality of message controllers which is dynamically selected.

12. The message controller as claimed in claim 1, wherein the fresh response includes a shared global title for versatile processing and onward routing of the message.

13. The message controller as claimed in claim 1, wherein the message controller is adapted to send a HSS routing query followed by a HLR query.

14. The message controller as claimed in claim 1, wherein the processor is adapted to add or delete application functions, or change their sequence, in a modular manner.

15. The message controller as claimed in claim 1, wherein the processor is adapted to execute Rule Based Decision Logic programs.

16. A method of operation of a message controller for a mobile network, the message controller comprising a digital processor and signal ports, and the method comprising the steps of:

receiving an incoming original routing query from a message service centre, processing the routing query and using information in the query to generate a plurality of fresh routing queries, and sending each fresh routing query to the destination of the original routing query and/or to an alternative destination, and wherein the message controller:

maintains a register of currently available resource servers, retrieves information from said resource servers for use in generating the fresh routing query or to determine where the fresh routing query is to be sent, receives a response to the fresh routing query, generates a fresh response for the message service centre which sent the original routing query, and executes application functions on a sequenced operation layer.

17. The method as claimed in claim 16, wherein the message controller extracts the MSISDN or equivalent in the original routing query and determines what further information could be obtained in addition to what was requested in the original routing query.

18. The method as claimed in claim 16, wherein the message controller extracts the MSISDN or equivalent in the original routing query and determines what further information could be obtained in addition to what was requested in the original routing query wherein the additional information is an SGSN address or IP-SM-GW address.

19. The method as claimed in any of claim 16, wherein the message controller caches data and uses said cached data to generate the fresh routing query.

20. The method as claimed in claim 16, wherein the message controller caches data and uses said cached data to generate the fresh routing query, and wherein a resource server is a presence server, and the message controller converts an MSISDN to a URI/IM address and sends a fresh routing query to the presence server.

21. The method as claimed in any of claim 16, wherein the message controller sends a fresh routing query to a HSS.

22. The method as claimed in claim 16, wherein the message controller sends a fresh routing query to a HSS, and wherein the fresh routing query is in the Diameter protocol.

23. The method as claimed in claim 16, wherein the fresh response includes data retrieved from a database or from a remote resource server.

24. The method as claimed in any of claim 16, wherein the fresh response includes a false address to cause the message to be sent to a smart services control node.

25. The method as claimed in claim 16, wherein the fresh response includes a false address to cause the message to be sent to a smart services control node, and wherein said node is the message controller or a different network element such as a different message controller.

26. The method as claimed in claim 16, wherein the fresh response includes a false address to cause the message to be sent to a smart services control node, and wherein the node is one of a plurality of message controllers which is dynamically selected.

27. The method as claimed in claim 16, wherein the fresh response includes a shared global title for versatile processing and onward routing of the message.

28. The method as claimed in claim 16, wherein the message controller sends a HSS query followed by a HLR query.

29. The method as claimed in claim 16, wherein the message controller exchanges SIP OPTIONS to determine presence and device capabilities.

30. A non-transitory computer readable medium comprising software code adapted to perform, when executing on a digital processor, a method of operation of a message controller for a mobile network, and the method comprising the steps of:

receiving an incoming original routing query from a message service centre, processing the routing query and using information in the query to generate a plurality of fresh routing queries, and sending each fresh routing query to the destination of the original routing query and/or to an alternative destination, and wherein the message controller:

maintains a register of currently available resource servers, retrieves information from said resource servers for use in generating the fresh routing query or to determine where the fresh routing query is to be sent, receives a response to the fresh routing query, generates a fresh response for the message service centre which sent the original routing query, and executes application functions on a sequenced operation layer.

\* \* \* \* \*